US011380048B2

(12) United States Patent
Wilkie (10) Patent No.: US 11,380,048 B2
(45) Date of Patent: Jul. 5, 2022

(54) METHOD AND SYSTEM FOR DETERMINING A SPECTRAL REPRESENTATION OF A COLOR

(71) Applicant: Weta Digital Limited, Wellington (NZ)

(72) Inventor: Alexander Wilkie, Vienna (AT)

(73) Assignee: Unity Technologies SF, San Francisco, CA (US)

( * ) Notice: Subject to any disclaimer, the term of this patent is extended or adjusted under 35 U.S.C. 154(b) by 0 days.

(21) Appl. No.: 17/127,284

(22) Filed: Dec. 18, 2020

(65) Prior Publication Data

US 2022/0012941 A1    Jan. 13, 2022

Related U.S. Application Data

(60) Provisional application No. 63/049,578, filed on Jul. 8, 2020.

(51) Int. Cl.
*G06T 15/50* (2011.01)
(52) U.S. Cl.
CPC ................................. *G06T 15/506* (2013.01)
(58) Field of Classification Search
CPC ....... G06T 15/506; G06T 15/06; G06T 15/50; H04N 1/60–628
See application file for complete search history.

(56) References Cited

U.S. PATENT DOCUMENTS

| 5,323,249 A | 6/1994 | Liang |
| 2009/0080009 A1 | 3/2009 | Takahashi et al. |
| 2009/0304269 A1 | 12/2009 | Willis |
| 2015/0350492 A1 | 12/2015 | Kurtz et al. |
| 2016/0212304 A1* | 7/2016 | Gish ........................ H04N 9/12 |
| 2020/0090398 A1* | 3/2020 | Ebstyne ................ G06T 15/005 |

OTHER PUBLICATIONS

Jakob, Wenzel, and Johannes Hanika. "A Low-Dimensional Function Space for Efficient Spectral Upsampling." Computer Graphics Forum. vol. 38. No. 2. 2019. (Year: 2019).*
Meng, Johannes. "Efficient Simulation of Spectral Light Transport in Dense Participating Media and Granular Materials." (Year: 2017).*
Jung et al., "Wide Gamut Spectral Upsampling with Fluorescence," Eurographics Symposium on Rendering 2019 38 (4); pp. 1-10 (2019).
International Search Report issued in PCT Application No. PCT/NZ2020/050066, dated Dec. 17, 2020.
Meng et al., "Physically Meaningful Rendering using Tristimulus Colours," Computer Graphics Forum 34(4):31-40 (2015).

* cited by examiner

*Primary Examiner* — Ryan McCulley
(74) *Attorney, Agent, or Firm* — Philip H. Albert; Haynes and Boone LLP (57) ABSTRACT

A computer-implemented method for digital processing is provided. A set of tristimulus values representing a first color in a color space are received. A first representation of a first spectral curve corresponding to the first color is determined, where the first spectral curve is within a gamut of solid reflectances. A second representation of a second spectral curve corresponding to the first color is determined where the second spectral curve contains at least one reflectance wavelength outside the gamut of solid reflectances. Based on selection criteria, the first representation or the second representation is selected. The selected representation is then applied during digital processing.

20 Claims, 8 Drawing Sheets

METHOD AND SYSTEM FOR DETERMINING A SPECTRAL REPRESENTATION OF A COLOR

CROSS-REFERENCES TO PRIORITY AND RELATED APPLICATIONS

This application claims the benefit of, and priority from, U.S. Provisional Patent Application No. 63,049,578 filed Jul. 8, 2020, entitled "Method and System for Rendering."

The entire disclosure of the application recited above is hereby incorporated by reference, as if set forth in full in this document, for all purposes.

FIELD

The present disclosure generally relates to techniques for digital processing, and more particularly to expanding a color space available for digital processing.

BACKGROUND

Physically-based rendering has received considerable attention in recent years. The availability of sophisticated material models and Monte Carlo sampling techniques makes it possible to create renderings of complex virtual worlds with stunning realism.

Several physically-based rendering systems throughout academia and industry simulate the underlying light transport spectrally, i.e. by considering the wavelength dependency of radiometric quantities. In contrast to simple RGB-based simulations, it is potentially considerably easier to support wave-optical effects, such as iridescence due to thin films, scratches, or other types of rough surface microstructure.

In the context of visual effects, spectral rendering is used to replicate the spectral sensitivity curves of cameras, thereby recreating the same metamerism as the onset objects to achieve a consistent look of real and virtual objects throughout all lighting conditions.

Spectra are the natural domain for computing products of colors as the approximation of this behavior through RGB triplets is often poor.

From a practical point of view, transitioning to spectral rendering has at least some disadvantages. One disadvantage is that scene content such as textures is typically created using tools that operate in various RGB color spaces, which in turn necessitates an ambiguous conversion to spectral data before rendering can commence. This ambiguous conversion is referred to as spectral upsampling.

Another disadvantage is that energy conservation imposes a hard limit, MacAdam's limit, on reflectance color saturation in any spectral renderer. No material can elastically scatter more light than it receives at any given wavelength. This disadvantage has the effect of limiting materials to the gamut or color space of solid reflectances, which intrinsically lack colors beyond a certain level of saturation. In some cases, however, such extreme colors are desired.

This issue is not restricted to simulations. For example, designers of real-world materials (e.g. plastics, textiles and paint) routinely rely on optical brighteners or other fluorescent dyes to boost their overall color saturation via inelastic scattering.

In contrast, in an RGB-based renderer it is possible to create very highly saturated colors, especially if a wide gamut RGB space is used as "working space" in which the multiplications of albedos and incident radiance are performed. While this approach is physically questionable at best, and problematic for colors outside the gamut of solid reflectances, it is noteworthy that within the limits of the spectral locus, a purely RGB-based workflow does not pose constraints on how bright or saturated objects can appear.

SUMMARY

This Summary is provided to introduce a selection of concepts in a simplified form that are further described below in the Detailed Description. This Summary is not intended to identify key features or essential features of the claimed subject matter, nor is it intended to limit the scope of the claimed subject matter. A more extensive presentation of features, details, utilities, and advantages of the surface computation method, as defined in the claims, is provided in the following written description of various embodiments of the disclosure and illustrated in the accompanying drawings.

In accordance with an aspect, a computer-implemented method for digital processing comprises: receiving a set of tristimulus values representing a first color in a color space; determining a first representation of a first spectral curve corresponding to the first color, wherein the first spectral curve is within a gamut of solid reflectances; determining a second representation of a second spectral curve corresponding to the first color, wherein the second spectral curve contains at least one reflectance wavelength outside the gamut of solid reflectances; selecting, based on selection criteria, the first representation or the second representation as a selected spectral representation; and applying the selected spectral representation during digital processing.

The term 'comprising' as used in this specification means 'consisting at least in part of'. When interpreting each statement in this specification that includes the term 'comprising', features other than that or those prefaced by the term may also be present. Related terms such as 'comprise' and 'comprises' are to be interpreted in the same manner.

In an embodiment, determining the at least one first reflectance coefficient comprises reducing an error between the second color and the first color in the color space.

In an embodiment, the method further comprises determining a second set of tristimulus values representing the second color in the color space using the at least one first reflectance coefficient.

In an embodiment, the digital processing includes rendering a scene.

In an embodiment, the digital processing includes compositing a scene.

In an embodiment, the selection criteria include the selected spectral representation increasing a brightness of at least one indicated color.

In an embodiment, the first representation comprises a first set of reflectance coefficients, and the second representation comprises a second set of reflectance coefficients and a first set of fluorescence coefficients.

In an embodiment, the fluorescence coefficients in the first set of fluorescence coefficients are associated with an emission peak wavelength, concentration, and Stokes shift of a fluorescence model.

In an embodiment, the method further comprises replacing the second set of reflectance coefficients and the first set of fluorescence coefficients with an adjacent set of reflectance coefficients and an adjacent set of fluorescent coefficients corresponding to a fourth color adjacent to a third color represented by the second representation.

In an embodiment, applying the selected spectral representation during digital processing includes determining a third color based on a sigmoid model that includes the second set of reflectance coefficients and the first set of fluorescent coefficients, and using the third color during digital processing.

In an embodiment, determining the first representation comprises reducing a distance between the first color and a second color represented by the first representation.

In an embodiment, the selection criteria include the selection criteria include the distance being at or below a threshold value.

In accordance with a further aspect, a computer system comprises at least one processor and a storage medium storing instructions that, when executed by the at least one processor, cause the system to implement the above method.

In accordance with a further aspect, a non-transitory storage medium stores instructions that, when executed by the at least one processor, cause the at least one processor to implement the above method.

In accordance with a further aspect, a non-transitory computer-readable medium carries instructions that, when executed by at least one processor, cause the at least one processor to implement the above method.

The invention in one aspect comprises several steps. The relation of one or more of such steps with respect to each of the others, the apparatus embodying features of construction, and combinations of elements and arrangement of parts that are adapted to affect such steps, are all exemplified in the following detailed disclosure.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting. Where specific integers are mentioned herein which have known equivalents in the art to which this invention relates, such known equivalents are deemed to be incorporated herein as if individually set forth.

As used herein, '(s)' following a noun means the plural and/or singular forms of the noun.

As used herein, the term 'and/or' means 'and' or 'or' or both.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9, and 10) and also any range of rational numbers within that range (for example, 2 to 8, 1.5 to 5.5, and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification where reference has been made to patent specifications, other external documents, or other sources of information, this is generally for the purpose of providing a context for discussing the features of the invention. Unless specifically stated otherwise, reference to such external documents or such sources of information is not to be construed as an admission that such documents or such sources of information, in any jurisdiction, are prior art or form part of the common general knowledge in the art.

In the description in this specification reference may be made to subject matter which is not within the scope of the appended claims. That subject matter should be readily identifiable by a person skilled in the art and may assist in putting into practice the invention as defined in the presently appended claims.

Although the present invention is broadly as defined above, those persons skilled in the art will appreciate that the invention is not limited thereto and that the invention also includes embodiments of which the following description gives examples.

BRIEF DESCRIPTION OF THE DRAWINGS

This patent application file contains at least one drawing executed in color. Copies of this patent application publication with color drawing(s) will be provided by the office upon request and payment of the necessary fee.

Various embodiments in accordance with the present disclosure will be described with reference to the drawings, in which.

DETAILED DESCRIPTION

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Disclosed below are techniques for digital processing, and more particularly to expanding a color space available for rendering.

Figure 1:
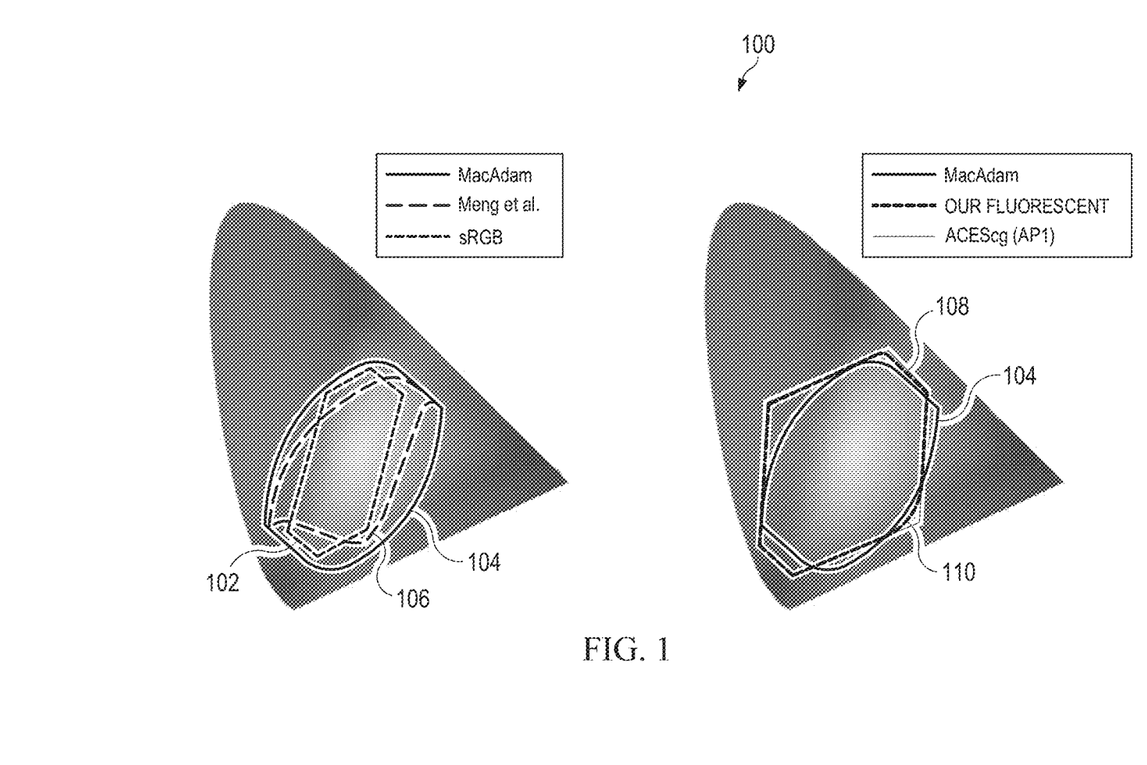
FIG. 1 is a diagram illustrating visible colors together with slices through several gamuts.

FIG. 1 shows an example of a Commission internationale de l'éclairage (CIE) chromaticity diagram 100 with all visible colors in a horseshoe shape. Also shown are two-dimensional color spaces 102, 104, 106, 108, 110 through different gamuts or three-dimensional color spaces. The color spaces are two-dimensional regions of a range of colors that are projected from a three-dimensional region.

Color space 102 illustrates a range of the sRGB gamut. Color space 104 illustrates the limits of the gamut of valid reflectance. Color space 106 illustrates the limits of the gamut of natural reflectance.

Color space 108 illustrates the ACEScg gamut that is used as input color space for the techniques described below, for example method 200 (see FIG. 2). Color space 110 illustrates the output color space of method 100 used to approximate color space 108 through fluorescent spectral upsampling. In the example, color space 110 is larger than color space 104.

Figure 2:
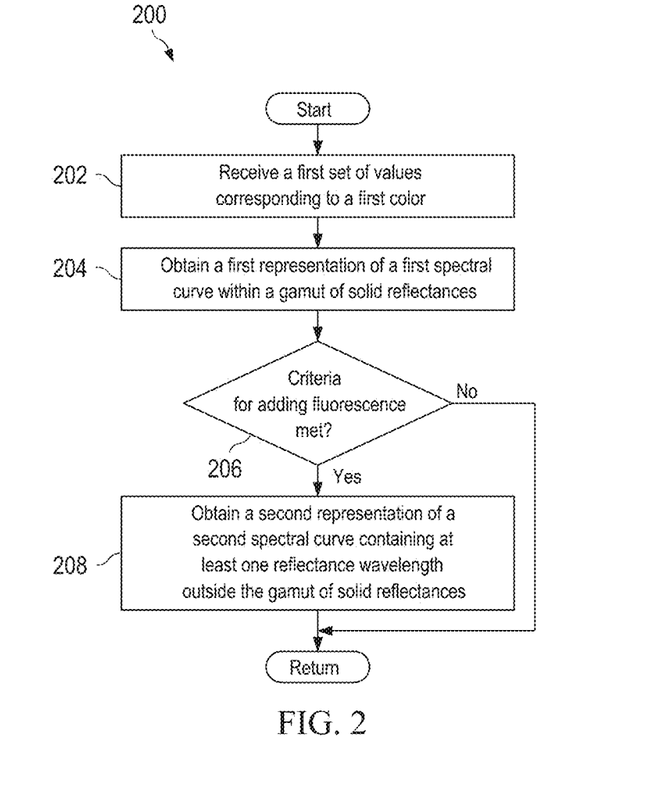
FIG. 2 shows a method of digital processing.

FIG. 2 shows an embodiment of a computer-implemented method 200 for image processing, for example, rendering or compositing. The method includes receiving 202 a first set of values representing a first color in a color space. In an example, the first set of values are tristimulus values representing RGB values. The tristimulus values may also comprise YCbCr, LMS or XYZ values for example.

In an embodiment, the color space represents a three-dimensional region formed by a range of colors associated with the tristimulus values. The first set of values represents a first color in color space 108 (see FIG. 1).

Method 200 determines or obtains 204 a first representation of a first spectral curve within a gamut of solid reflectances. The representation corresponds to the first color and may be include a first set of (one or more) reflectance coefficients determined by reducing an error between a second color associated with the first representation and the first color in the color space. In an example, reducing the error includes minimizing the objective function given by a Euclidean distance between the input color (the first color in the color space) and the color associated with the first representation (the second color).

A second set of values representing the second color in the color space using the first set of reflectance coefficients may be used to reduce the error between the second color and first color. In an example, the second set of values are tristimulus RGB values. The second set of values may also comprise other tristimulus values such as YCbCr, LMS or XYZ values for example. In an embodiment, the second set of tristimulus values is obtained by applying a function based on a chromatic response of an observer. For example, the function may be the CIE 1931 2° Standard Observer function, the CIE 1964 10° Standard Observer, or a similar function.

In an example, spectral upsampling techniques are used to upsample RGB values of a color to a full spectrum. The first set of reflectance coefficients represent the full spectrum of a color. Energy conservation is not taken into account during the optimization and is enforced later on by scaling, hence bright spectra are not always achievable.

In an embodiment, the first reflectance coefficient(s) may have three coefficients:

$$c_r = (c_0, c_1, c_2)$$

Energy-conserving reflectance on interval [0, 1] may be modelled using the following quadratic polynomial and sigmoid. The interval represents a multiple of how much reflectance there is, 1 being full reflectance at a wavelength ($\lambda$), and 0 being no reflectance (full absorption). The following composition of a quadratic polynomial and a sigmoid is used to express both saturated colors using blocky spectra as well as more moderate input with smooth spectra.

Figure 4:
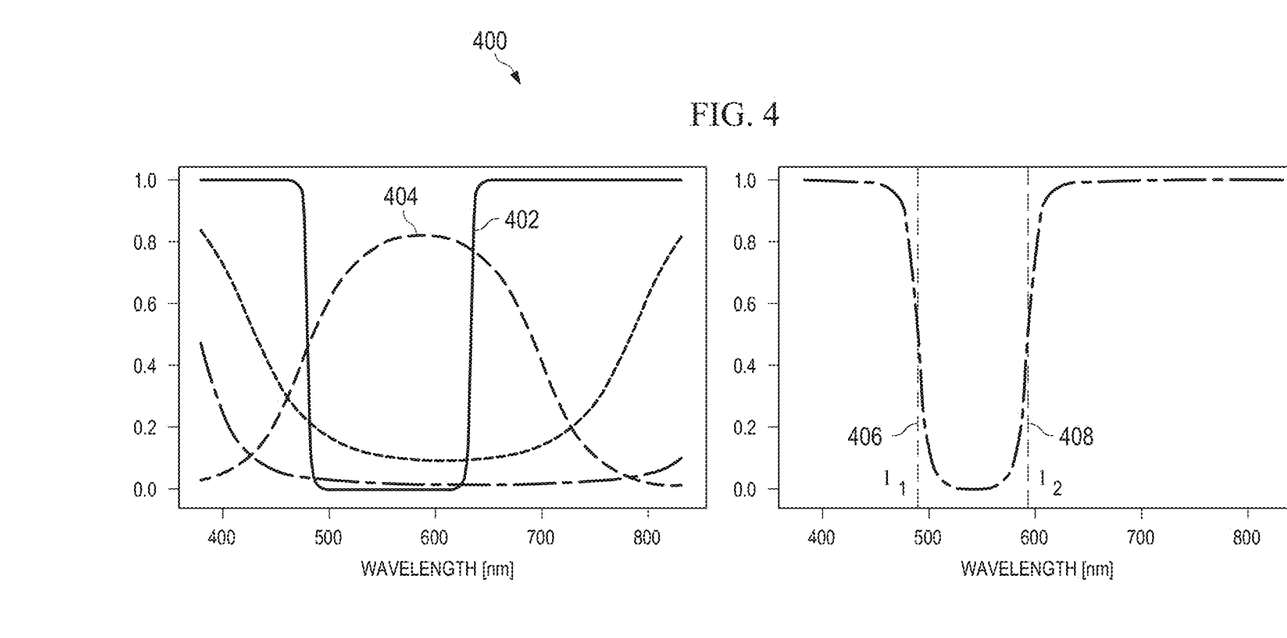
FIG. 4 shows examples of blocky spectra and smooth spectra.

FIG. 4 shows examples of blocky spectra 402 and smooth spectra 404:

$$r(\lambda) = S(P(\lambda)), \text{ where } P(\lambda) = c_0\lambda^2 + c_1\lambda + c_2, \text{ and}$$

$$S(x) = \frac{1}{2} + \frac{x}{2\sqrt{1+x^2}}$$

In an example the first reflectance coefficient(s) is/are interpolated from a 3D look-up table generated using a one-time optimization step using the above equation.

Blocky spectra at the boundary of the gamut or color space of valid reflectances have the potential to be avoided in favor of smoother spectra. Fluorescent dyes are used as optical brighteners to compensate for a lack of saturation. This approach has the potential to go outside the reflectance gamut or color space and represent a richer set of colors.

To obtain the second color or the representation of the first color represented by the coefficients, the following equation of reflectivity R for a given illuminant $I(\lambda)$ is used:

$$R(\lambda) = r(\lambda) \cdot (1 - ca(\lambda)) \cdot I(\lambda) + e(\lambda) \cdot \int_{-\infty}^{\infty} ca(\overline{\lambda}) I(\overline{\lambda}) d\overline{\lambda}$$

The reflectivity R is converted to RGB using color matching functions associated with the desired color space. The color matching functions reduce a spectral distribution down to tristimulus values via integration. Color matching functions vary depending on the observer. For example, a color matching function representing a human's perception is different to a color matching function representing a camera's perception.

FIG. 4 shows several exemplary reflectance spectra created via non-fluorescent spectral upsampling using the Energy-conserving reflectance model above. Box-like spectra 402 are undesirable given the smoothness of natural reflectance spectra in the visible range. Box-like results are penalized using a metric that quantifies the smoothness of the resulting spectra. The highest absolute derivative value that the model $r(\lambda)$ produces on the visible range $[\lambda_{min}, \lambda_{max}]$ in nanometers (nm) is used.

In an embodiment, an approximation rather than the true maximum absolute derivative is calculated. First, the extremal values are obtained so that the function reaches on the interval:

$$\mathcal{R} := \{r(\lambda_{min}), r(\lambda_{max}), r(\lambda_{ext})\}$$

$$\lambda_{ext} = -c_1/2c_0$$

$\lambda_{ext}$ is the global minimum or maximum of the polynomial and is only included if it lies between $\lambda_{min}$ and $\lambda_{max}$.

Exploiting the monotonicity of the sigmoid S, the midpoint of this range is mapped through its inverse:

$$y_{mid} = S^{-1}(\max \mathcal{R} + \min \mathcal{R}/2).$$

To determine the associated wavelength, it is necessary to solve the quadratic equation $P(\lambda_{1,2}) = y_{mid}$. The final approximate derivative value is given by either $|r'(\lambda_1)|$ or $|r'(\lambda_2)|$. Either solution is suitable. An example is shown in FIG. 4 at 406 and 408.

The accuracy of this approximation increases with the maximum slope of r. For a box-like spectrum with values mostly close to 0 or 1, the corresponding internal polynomial P reaches extremely low and high values, which are mapped to close to 0 and close to 1 by the sigmoid S, with the steepest derivative of S(P) at $$S = (\text{almost0} + \text{almost1})/2 \approx 0.5$$

for symmetry reasons.

It is desirable to penalize spectra above a certain steepness. Therefore, there is not a need to address smooth spectra where the approximation is less accurate.

Large derivatives have penalties. Spectra with an absolute derivative above a threshold t are penalized by adding the term $100 \cdot \max\{0, |r'(\lambda_1)| - t\}$ to the optimization objective. In an example, the optimization objective is the distance inside the color space. In an example, the threshold t=0.016 (when plotted over wavelengths in nm), which is the maximum derivative of the sigmoid S observed on the classic Macbeth color checker, is used for smooth spectra. The maximum derivative serves to eliminate sigmoid S with unrealistically steep sides that are not representative of reflectance spectra in nature. It is desirable to use |r'($\lambda_1$)|−t in order to assure a continuous optimization objective.

Considering that color distances inside the three-dimensional color space can reach values in [0,√3], this difference can be scaled by a factor of 100 in order to impact the target function even for slightly larger derivatives, causing the optimizer to prefer the fluorescent component to reduce the error between the first color and the second color.

Referring to FIG. 2, in some cases, one or more criteria for adding a fluorescent component may be met. For example, the criteria may indicate that a particular color be brightened, or that the error between the first color and the second color based on the first set of reflectance coefficients is above a threshold. The error may correspond to the Euclidian distance between the tristimulus values of the first color and the tristimulus values of the second color. If the criteria is met 206 (e.g., if the error is above the threshold), the first reflectance coefficient(s) is/are extended with a set of (one or more) fluorescence coefficients. The fluorescence coefficients may represent the peak wavelength of the emission spectrum, a mixing factor, and/or the fluorophore's stokes shift (e.g., the Stokes shift of the fluorescent model).

Method 200 further determines or obtains 208 a second representation of a second spectral curve corresponding to the first color, where the second spectral curve contains at least one reflectance wavelength outside the gamut of solid reflectances. The second representation may include a second set of (one or more) reflectance coefficients and a first set of (one or more) fluorescence coefficients.

Once the second representation is obtained or determined, the first representation or the second representation may be selected based on the criteria discussed in step 206. For example, if the criteria indicated the distance (or error) between the first color and the second color should be below a threshold and the criteria is met without requiring the second representation or before the second representation is determined, the first representation may be selected. However, if the distance or error is above the threshold, the second representation may be selected. In another example, if the criteria indicate a particular color should be brightened and the second representation does so (e.g., because of the set of fluorescent coefficients), the second representation may be chosen. Once a representation is selected (which may include storing the representation for later use), the selected representation may be applied during various digital processes. For example, the representation may be applied during digital imaging processes such as rendering and/or compositing, or other digital processes such as 3D printing.

In an example, the first set of reflectance coefficients may not provide an accurate enough approximation for the first color and the first set of fluorescence coefficients may be required for a more accurate approximation. Inaccurate approximations can occur when there is no physically valid reflectance for the given input color, or when a physically valid reflectance exists but is rejected for being too box-like.

Fluorescence is the process of light being absorbed at one wavelength and re-emitted at another, usually longer, wavelength. In an example, this process is assumed to be instantaneous.

Figure 6:
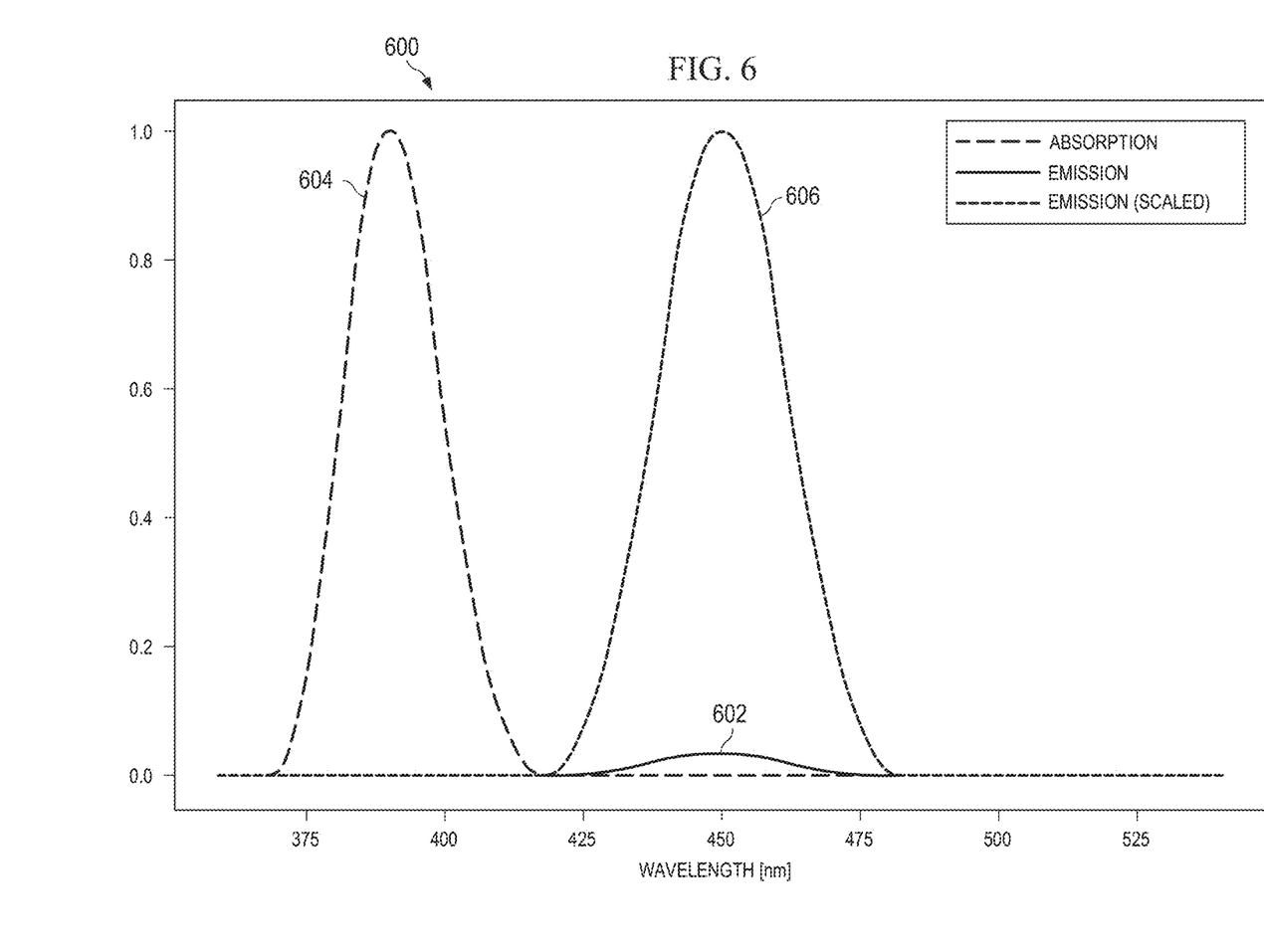
FIG. 6 shows an example of a typical resulting emission and absorption spectrum pair.

The most important parameters for fluorescence are the absorption spectrum and the emission spectrum. FIG. 6 shows an example 600 of an emission 602 and absorption 604 spectrum pair determined by the techniques described below.

The absorption spectrum a($\lambda_i$) determines how much light is absorbed for a given wavelength. This light is then re-emitted with a spectral distribution following the emission spectrum e($\lambda_0$). The distance between the absorption and emission spectrum's peak wavelength is known as the Stokes shift. Adding a fluorescent component to the second color allows the first color to be approximated from a larger gamut or color space.

Fluorescence may be modelled using the following equation:

$$f(\lambda_i, \omega_i, \omega_0, \lambda_0) = [\delta_{\lambda_i, \lambda_0}(1 - ca(\lambda_i))r(\lambda_i) + ca(\lambda_i)Qe(\lambda_0)]/\pi$$

The left summand in the numerator is the regular reflection. The Dirac delta function on the left ensures that this term only contributes when $\lambda_i = \lambda_0$. c is a scalar introduced for convenience to scale down the absorption spectrum a($\lambda_i$), and r($\lambda$) is the non-fluorescent reflectance spectrum. In the right summand, the fluorescent part, Q accounts for the quantum yield and e($\lambda_0$) is the emission spectrum mentioned above.

For any input or first color represented in a set of tristimulus values, a matching r($\lambda$), a($\lambda$), e($\lambda$) and c is obtained.

The fluorescence model requires concrete absorption and emission spectra. In an example, a simple low-dimensional parametric model is used to ensure that the model is efficient to use at render time. The low-dimensional parametric model can also be importance sampled analytically and may be used for techniques used for simulating how light transports through a scene such as computer graphics rendering. In an example, the fluorescence model may be used for Monte Carlo light transport simulation. The analytic model also enables a considerably simplified optimization of model parameters for a set of tristimulus values of a first or input color.

Several real-world materials have quantum yields Q close to 100%. In an example, the value of Q is selected to be as high as physically reasonable in order to achieve higher saturations via reradiation. In an example, the parameter Q is fixed to a value of 0.96 in order to keep the number of parameters small. Considering the fluorescence model, a lower Q would be mathematically equivalent to a larger Q coupled with lowering c and r($\lambda$), so little benefit is expected from using an additional parameter for Q.

In an example, the fluorescent coefficients are associated with emission peak wavelength, concentration, and stoke shift of a fluorescence model. The fluorescent coefficients have three parameters: $c_f = (\lambda_e, c, s)$. The peak wavelength of the emission spectrum is $\lambda_e$ in nm. The mixing factor c represents the amount of fluorescence. The stokes shift s in nm describes the distance between the emission and absorption spectrum's peak wavelengths.

In an example, the emission spectrum is modelled with a cubic b-spline:

$$b(x) = \begin{cases} \frac{(x+3)^2}{6} & \text{if } -3 < x \leq -1 \\ -\frac{x^2}{3} + 1 & \text{if } -1 < x \leq 1 \\ \frac{(x-3)^2}{6} & \text{if } 1 < x < 3 \end{cases}$$

The emission spectrum model is stretched and translated to account for varying spectral widths and $\lambda_e$, respectively. The absorption spectrum is defined as the mirror image of the emission spectrum plotted over wavenumber. This is often the case for real materials.

The pair of emission and absorption spectra are modelled such that they touch but do not overlap. This assumption simplifies the emission and absorption spectra model because the effects of excitation and emission may be modelled as separable without the danger of sampling events that transition to shorter wavelengths.

A scaling factor $\alpha$ may used to stretch the emission spectrum, such that mirroring it over wavelength results in an absorption peak wavelength at the specified distance s:

$$\alpha = \frac{\lambda_e S}{2\lambda_e - S}$$

This leads to the emission spectrum:

$$e(\lambda_o) = b\left(\frac{3}{\alpha}(\lambda_o - \lambda_e)\right) \cdot \frac{9}{8\alpha}$$

and the absorption spectrum:

$$a(\lambda_i) = b\left(\frac{3}{\alpha} \cdot \left(\left(\frac{2}{\lambda_e - \alpha} - \frac{1}{\lambda_i}\right)^{-1} - \lambda_e\right)\right).$$

In contrast to the absorption spectrum, which takes on the value 1 at its peak, the emission spectrum is normalized or scaled 606 so that it integrates to 1. This normalization constant for $e(\lambda_o)$ has a closed-form solution and is given by $9/(8\alpha)$.

In an example, the second reflectance coefficient(s) and the fluorescent coefficient(s) are determined by reducing a Euclidian distance between the second color and the first color in the color space.

In an example, the fluorescent coefficient(s) is/are determined from the first reflectance coefficient(s) by evaluating a specified range of values of the fluorescent coefficient(s) to determine a value of the fluorescent coefficient(s) that satisfies a criterion.

Figure 3:
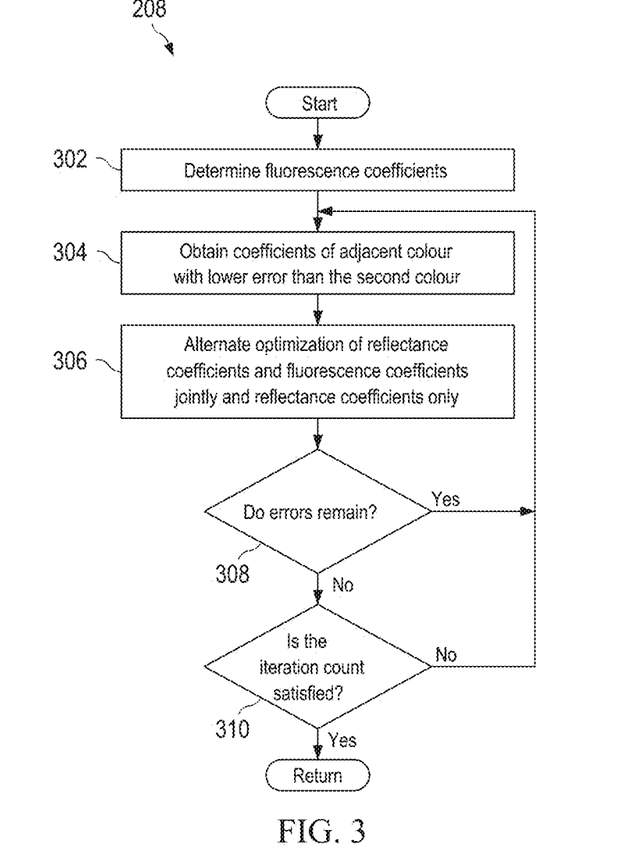
FIG. 3 shows an example of a method for obtaining second reflectance coefficient(s) and fluorescence coefficient(s) from FIG. 2.

Referring to FIG. 3, the first reflectance coefficient(s) obtained from the energy-conserving reflectance model may be used to determine 302 a set of fluorescence coefficients with low error. Reasonable bounds may be found for the fluorescence coefficients indicating the emission peak wavelength, concentration, and Stokes Shift of the fluorescence spectra. One example of reasonable bounds for absorption is 320 nm to 550 nm. One example of reasonable bounds for emission is 380 nm to 680 nm. One example of reasonable bounds for Stokes Shift is 50 nm to 150 nm.

A brute-force search approach may be used within the reasonable bounds to find values of fluorescent coefficients with low error, given the at least one first reflectance coefficients.

Figure 5:
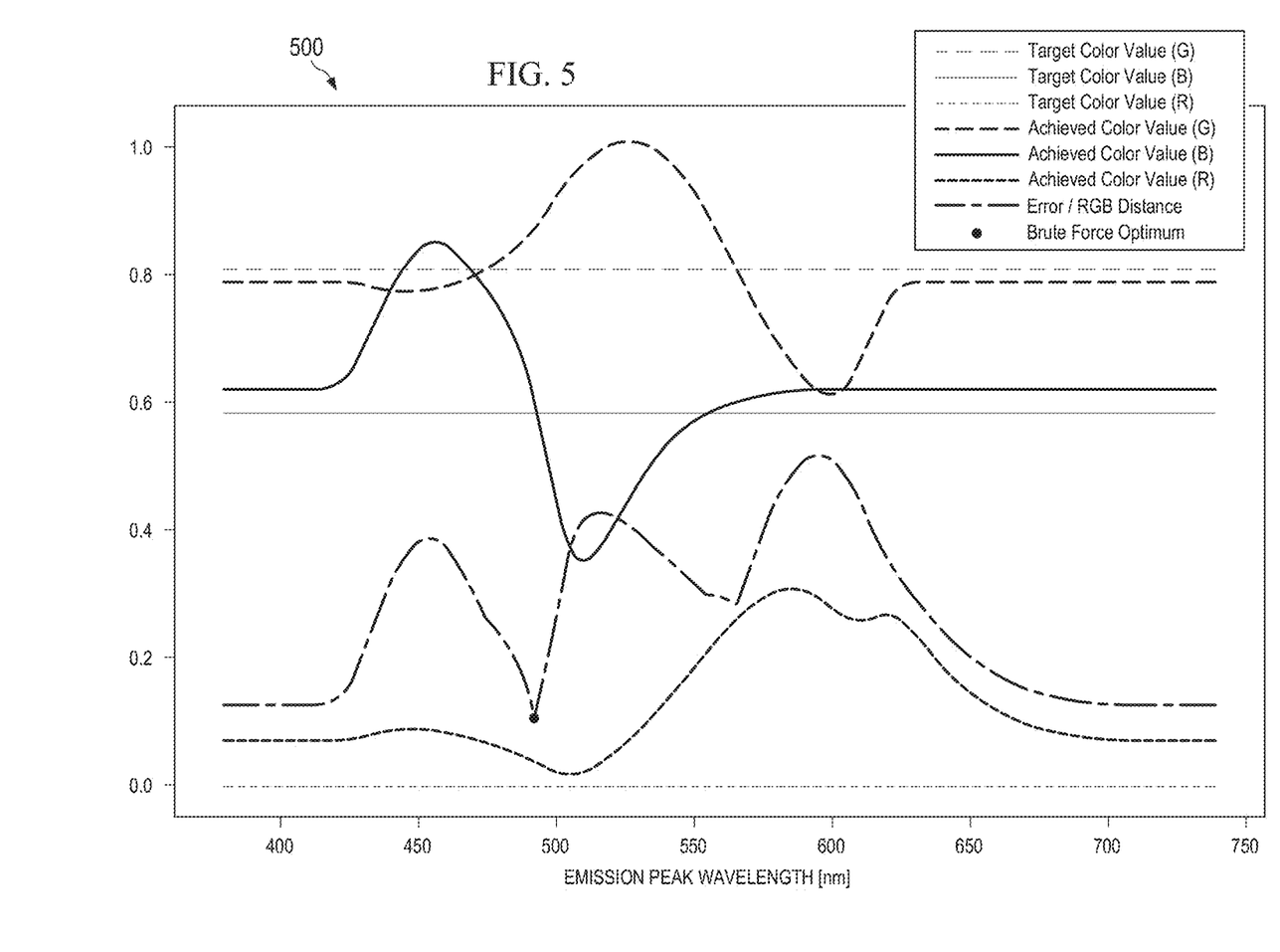
FIG. 5 shows an example of a brute-force search from FIG. 3.

FIG. 5 shows at 500 a one-dimensional slice of such a brute-force search for fixed $c_r$, c and, s. FIG. 5 reveals an intricate optimization objective with several local minima.

In an example, the process of reducing the Euclidian distance between the second color and the first color in the color space involves alternating between optimizing both the second reflectance coefficient(s) and the fluorescent coefficient(s) and between only optimizing the second reflectance coefficient(s). In an embodiment a non-linear gradient descent optimizer performs the optimizing.

Referring to method 300 of FIG. 3, the fluorescence coefficients obtained from a brute-force search approach may be further optimized with the second reflectance coefficients jointly. In an embodiment, the process alternates 306 between only optimizing the second reflectance coefficients and optimizing the fluorescence coefficients and the second reflectance coefficients jointly.

The optimization process is terminated after a maximum number of iterations 310, or when the error no longer improves 308. In an example the maximum number of iterations is set at 50 iterations. In an example, the error threshold for whether a second color is a close enough approximation of the first color is based on a distance between the first color and the second color in the color space.

In an example, method 208 includes the step of obtaining 304 coefficients of adjacent color with lower error than the second color. The second reflectance coefficient(s) and the fluorescent coefficient(s) of the second color are replaced with the second reflectance coefficient(s) and the fluorescent coefficient(s) of an adjacent color to the second color. The adjacent color to the second color are neighbors in the color space.

For each optimization iteration, the second reflectance coefficients and the fluorescence coefficients from adjacent colors are used if the second reflectance coefficients and fluorescence coefficients of the second color have not yet converged below an error threshold. In an example, 26 adjacent colors are analyzed for coefficients with a lower error than the second color. The coefficients of one of the 26 adjacent colors with the least error may be selected to replace the coefficients of the second color.

If coefficients of an adjacent color with a lower error are found, the coefficients of the adjacent color are used to initialize the starting approximation of the subsequent iteration for alternating between optimizing the second reflectance coefficients and fluorescence coefficients jointly and between optimizing the second reflectance coefficients only. This process repeats several times to ensure that information can propagate to more distant entries. In an example, error thresholds are decreased over optimization iterations by comparing the error of an adjacent color to an error of the second color.

Method 200 may include storing either the first approximation of the first color or the second approximation of the first color as the first color in a rendering engine 750 (see FIG. 7) for example. Method 200 may be used in Monte Carlo rendering systems.

Figure 7:
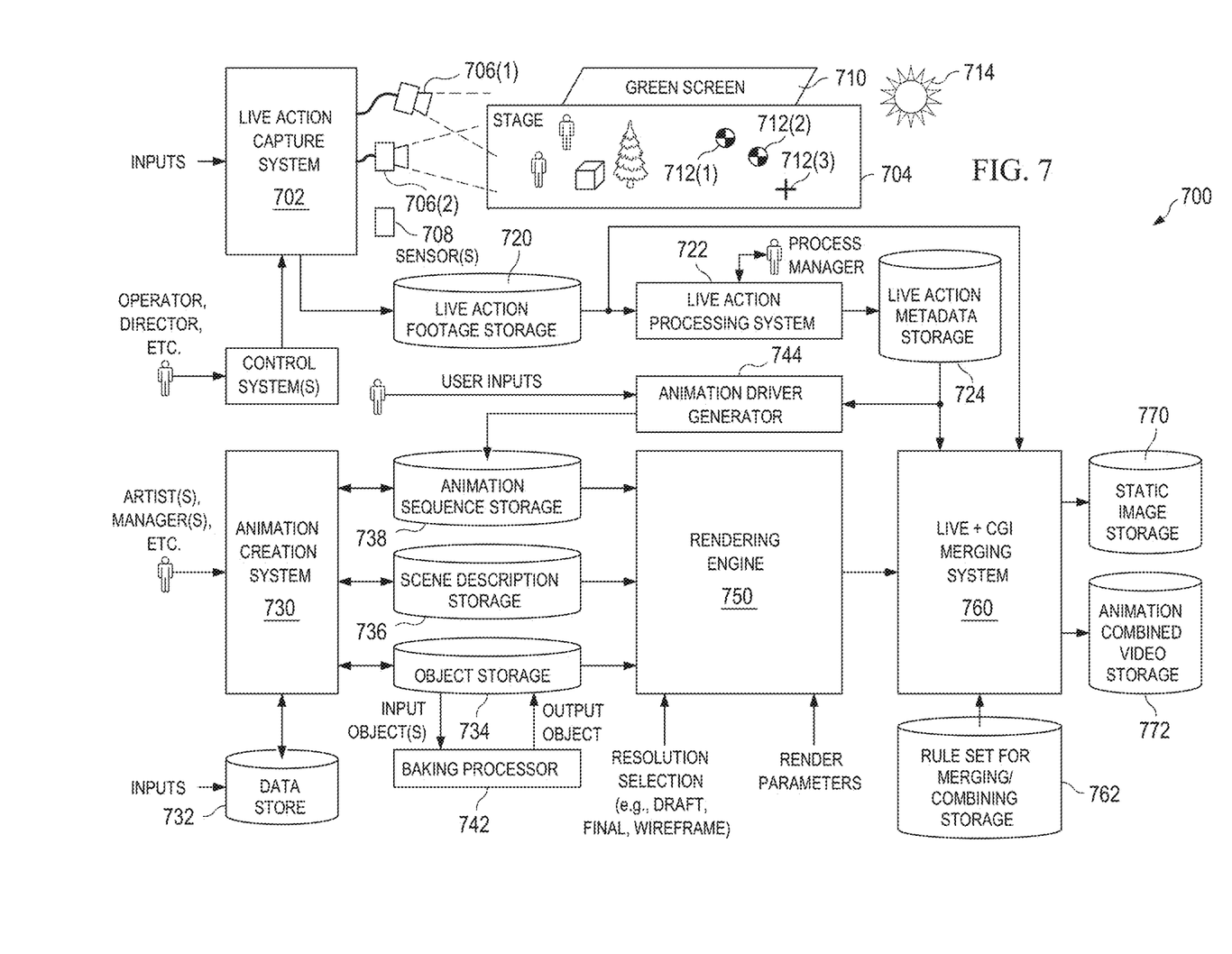
FIG. 7 illustrates an example visual content generation system as might be used to generate imagery in the form of still images and/or video sequences of images

For example, FIG. 7 illustrates the example visual content generation system 700 as might be used to generate imagery in the form of still images and/or video sequences of images. The visual content generation system 700 might generate imagery of live action scenes, computer generated scenes, or a combination thereof. In a practical system, users are provided with tools that allow them to specify, at high levels and low levels where necessary, what is to go into that imagery. For example, a user might be an animation artist and might use the visual content generation system 700 to capture interaction between two human actors performing live on a sound stage and replace one of the human actors with a computer-generated anthropomorphic non-human being that behaves in ways that mimic the replaced human actor's movements and mannerisms, and then add in a third computer-generated character and background scene elements that are computer-generated, all in order to tell a desired story or generate desired imagery.

Still images that are output by the visual content generation system 700 might be represented in computer memory as pixel arrays, such as a two-dimensional array of pixel color values, each associated with a pixel having a position in a two-dimensional image array. Pixel color values might be represented by three or more (or fewer) color values per pixel, such as a red value, a green value, and a blue value (e.g., in RGB format). Dimensions of such a two-dimensional array of pixel color values might correspond to a preferred and/or standard display scheme, such as 1920-pixel columns by 1280-pixel rows or some other resolution. Images might or might not be stored in a compressed format, but either way, a desired image may be represented as a two-dimensional array of pixel color values. In another variation, images are represented by a pair of stereo images for three-dimensional presentations and in other variations, some or all of an image output might represent three-dimensional imagery instead of just two-dimensional views. In yet other embodiments, pixel values are data structures and a pixel value can be associated with a pixel and can be a scalar value, a vector, or another data structure associated with a corresponding pixel. That pixel value might include color values, or not, and might include depth values, alpha values, weight values, object identifiers or other pixel value components.

A stored video sequence might include a plurality of images such as the still images described above, but where each image of the plurality of images has a place in a timing sequence and the stored video sequence is arranged so that when each image is displayed in order, at a time indicated by the timing sequence, the display presents what appears to be moving and/or changing imagery. In one representation, each image of the plurality of images is a video frame having a specified frame number that corresponds to an amount of time that would elapse from when a video sequence begins playing until that specified frame is displayed. A frame rate might be used to describe how many frames of the stored video sequence are displayed per unit time. Example video sequences might include 24 frames per second (24 FPS), 50 FPS, 140 FPS, or other frame rates. In some embodiments, frames are interlaced or otherwise presented for display, but for the purpose of clarity of description, in some examples, it is assumed that a video frame has one specified display time and it should be understood that other variations are possible.

One method of creating a video sequence is to simply use a video camera to record a live action scene, i.e., events that physically occur and can be recorded by a video camera. The events being recorded can be events to be interpreted as viewed (such as seeing two human actors talk to each other) and/or can include events to be interpreted differently due to clever camera operations (such as moving actors about a stage to make one appear larger than the other despite the actors actually being of similar build, or using miniature objects with other miniature objects so as to be interpreted as a scene containing life-sized objects).

Creating video sequences for story-telling or other purposes often calls for scenes that cannot be created with live actors, such as a talking tree, an anthropomorphic object, space battles, and the like. Such video sequences might be generated computationally rather than capturing light from live scenes. In some instances, an entirety of a video sequence might be generated computationally, as in the case of a computer-animated feature film. In some video sequences, it is desirable to have some computer-generated imagery and some live action, perhaps with some careful merging of the two.

While computer-generated imagery might be creatable by manually specifying each color value for each pixel in each frame, this is likely too tedious to be practical. As a result, a creator uses various tools to specify the imagery at a higher level. As an example, an artist might specify the positions in a scene space, such as a three-dimensional coordinate system, of objects and/or lighting, as well as a camera viewpoint, and a camera view plane. Taking all of that as inputs, a rendering engine may compute each of the pixel values in each of the frames. In another example, an artist specifies position and movement of an articulated object having some specified texture rather than specifying the color of each pixel representing that articulated object in each frame.

In a specific example, a rendering engine performs ray tracing wherein a pixel color value is determined by computing which objects lie along a ray traced in the scene space from the camera viewpoint through a point or portion of the camera view plane that corresponds to that pixel. For example, a camera view plane might be represented as a rectangle having a position in the scene space that is divided into a grid corresponding to the pixels of the ultimate image to be generated, and if a ray defined by the camera viewpoint in the scene space and a given pixel in that grid first intersects a solid, opaque, blue object, that given pixel is assigned the color blue. Of course, for modern computer-generated imagery, determining pixel colors—and thereby generating imagery—can be more complicated, as there are lighting issues, reflections, interpolations, and other considerations.

As illustrated in FIG. 7, a live action capture system 702 captures a live scene that plays out on a stage 704. The live action capture system 702 is described herein in greater detail, but might include computer processing capabilities, image processing capabilities, one or more processors, program code storage for storing program instructions executable by the one or more processors, as well as user input devices and user output devices, not all of which are shown.

In a specific live action capture system, cameras 706(1) and 706(2) capture the scene, while in some systems, there might be other sensor(s) 708 that capture information from the live scene (e.g., infrared cameras, infrared sensors, motion capture ("mo-cap") detectors, etc.). On the stage 704, there might be human actors, animal actors, inanimate objects, background objects, and possibly an object such as a green screen 710 that is designed to be captured in a live scene recording in such a way that it is easily overlaid with computer-generated imagery. The stage 704 might also contain objects that serve as fiducials, such as fiducials 712(1)-(3), that might be used post-capture to determine where an object was during capture. A live action scene might be illuminated by one or more lights, such as an overhead light 714.

During or following the capture of a live action scene, the live action capture system 702 might output live action footage to a live action footage storage 720. A live action processing system 722 might process live action footage to generate data about that live action footage and store that data into a live action metadata storage 724. The live action processing system 722 might include computer processing capabilities, image processing capabilities, one or more processors, program code storage for storing program instructions executable by the one or more processors, as well as user input devices and user output devices, not all of which are shown. The live action processing system 722 might process live action footage to determine boundaries of objects in a frame or multiple frames, determine locations of objects in a live action scene, where a camera was relative to some action, distances between moving objects and fiducials, etc. Where elements are sensed or detected, the metadata might include location, color, and intensity of the overhead light 714, as that might be useful in post-processing to match computer-generated lighting on objects that are computer-generated and overlaid on the live action footage. The live action processing system 722 might operate autonomously, perhaps based on predetermined program instructions, to generate and output the live action metadata upon receiving and inputting the live action footage. The live action footage can be camera-captured data as well as data from other sensors.

An animation creation system 730 is another part of the visual content generation system 700. The animation creation system 730 might include computer processing capabilities, image processing capabilities, one or more processors, program code storage for storing program instructions executable by the one or more processors, as well as user input devices and user output devices, not all of which are shown. The animation creation system 730 might be used by animation artists, managers, and others to specify details, perhaps programmatically and/or interactively, of imagery to be generated. From user input and data from a database or other data source, indicated as a data store 732, the animation creation system 730 might generate and output data representing objects (e.g., a horse, a human, a ball, a teapot, a cloud, a light source, a texture, etc.) to an object storage 734, generate and output data representing a scene into a scene description storage 736, and/or generate and output data representing animation sequences to an animation sequence storage 738.

Scene data might indicate locations of objects and other visual elements, values of their parameters, lighting, camera location, camera view plane, and other details that a rendering engine 750 might use to render CGI imagery. For example, scene data might include the locations of several articulated characters, background objects, lighting, etc. specified in a two-dimensional space, three-dimensional space, or other dimensional space (such as a 2.5-dimensional space, three-quarter dimensions, pseudo-3D spaces, etc.) along with locations of a camera viewpoint and view place from which to render imagery. For example, scene data might indicate that there is to be a red, fuzzy, talking dog in the right half of a video and a stationary tree in the left half of the video, all illuminated by a bright point light source that is above and behind the camera viewpoint. In some cases, the camera viewpoint is not explicit, but can be determined from a viewing frustum. In the case of imagery that is to be rendered to a rectangular view, the frustum would be a truncated pyramid. Other shapes for a rendered view are possible and the camera view plane could be different for different shapes.

The animation creation system 730 might be interactive, allowing a user to read in animation sequences, scene descriptions, object details, etc. and edit those, possibly returning them to storage to update or replace existing data. As an example, an operator might read in objects from object storage into a baking processor that would transform those objects into simpler forms and return those to the object storage 734 as new or different objects. For example, an operator might read in an object that has dozens of specified parameters (movable joints, color options, textures, etc.), select some values for those parameters and then save a baked object that is a simplified object with now fixed values for those parameters.

Rather than having requiring user specification of each detail of a scene, data from the data store 732 might be used to drive object presentation. For example, if an artist is creating an animation of a spaceship passing over the surface of the Earth, instead of manually drawing or specifying a coastline, the artist might specify that the animation creation system 730 is to read data from the data store 732 in a file containing coordinates of Earth coastlines and generate background elements of a scene using that coastline data.

Animation sequence data might be in the form of time series of data for control points of an object that has attributes that are controllable. For example, an object might be a humanoid character with limbs and joints that are movable in manners similar to typical human movements. An artist can specify an animation sequence at a high level, such as "the left hand moves from location (X1, Y1, Z1) to (X2, Y2, Z2) over time T1 to T2", at a lower level (e.g., "move the elbow joint 2.5 degrees per frame") or even at a very high level (e.g., "character A should move, consistent with the laws of physics that are given for this scene, from point P1 to point P2 along a specified path").

Animation sequences in an animated scene might be specified by what happens in a live action scene. An animation driver generator 744 might read in live action metadata, such as data representing movements and positions of body parts of a live actor during a live action scene, and generate corresponding animation parameters to be stored in the animation sequence storage 738 for use in animating a CGI object. This can be useful where a live action scene of a human actor is captured while wearing mo-cap fiducials (e.g., high-contrast markers outside actor clothing, high-visibility paint on actor skin, face, etc.) and the movement of those fiducials is determined by the live action processing system 722. The animation driver generator 744 might convert that movement data into specifications of how joints of an articulated CGI character are to move over time.

A rendering engine 750 can read in animation sequences, scene descriptions, and object details, as well as rendering engine control inputs, such as a resolution selection and a set of rendering parameters. Resolution selection might be useful for an operator to control a trade-off between speed of rendering and clarity of detail, as speed might be more important than clarity for a movie maker to test a particular interaction or direction, while clarity might be more important that speed for a movie maker to generate data that will be used for final prints of feature films to be distributed. The rendering engine 750 might include computer processing capabilities, image processing capabilities, one or more processors, program code storage for storing program instructions executable by the one or more processors, as well as user input devices and user output devices, not all of which are shown.

The visual content generation system 700 can also include a merging system 760 that merges live footage with animated content. The live footage might be obtained and input by reading from the live action footage storage 720 to obtain live action footage, by reading from the live action metadata storage 724 to obtain details such as presumed segmentation in captured images segmenting objects in a live action scene from their background (perhaps aided by the fact that the green screen 710 was part of the live action scene), and by obtaining CGI imagery from the rendering engine 750.

A merging system 760 might also read data from a ruleset for merging/combining storage 762. A very simple example of a rule in a ruleset might be "obtain a full image including a two-dimensional pixel array from live footage, obtain a full image including a two-dimensional pixel array from the rendering engine 750, and output an image where each pixel is a corresponding pixel from the rendering engine 750 when the corresponding pixel in the live footage is a specific color of green, otherwise output a pixel value from the corresponding pixel in the live footage."

The merging system 760 might include computer processing capabilities, image processing capabilities, one or more processors, program code storage for storing program instructions executable by the one or more processors, as well as user input devices and user output devices, not all of which are shown. The merging system 760 might operate autonomously, following programming instructions, or might have a user interface or programmatic interface over which an operator can control a merging process. In some embodiments, an operator can specify parameter values to use in a merging process and/or might specify specific tweaks to be made to an output of the merging system 760, such as modifying boundaries of segmented objects, inserting blurs to smooth out imperfections, or adding other effects. Based on its inputs, the merging system 760 can output an image to be stored in a static image storage 770 and/or a sequence of images in the form of video to be stored in an animated/combined video storage 772.

Thus, as described, the visual content generation system 700 can be used to generate video that combines live action with computer-generated animation using various components and tools, some of which are described in more detail herein. While the visual content generation system 700 might be useful for such combinations, with suitable settings, it can be used for outputting entirely live action footage or entirely CGI sequences. The code may also be provided and/or carried by a transitory computer readable medium, e.g., a transmission medium such as in the form of a signal transmitted over a network.

According to one embodiment, the techniques described herein are implemented by one or generalized computing systems programmed to perform the techniques pursuant to program instructions in firmware, memory, other storage, or a combination. Special-purpose computing devices may be used, such as desktop computer systems, portable computer systems, handheld devices, networking devices or any other device that incorporates hard-wired and/or program logic to implement the techniques.

Figure 8:
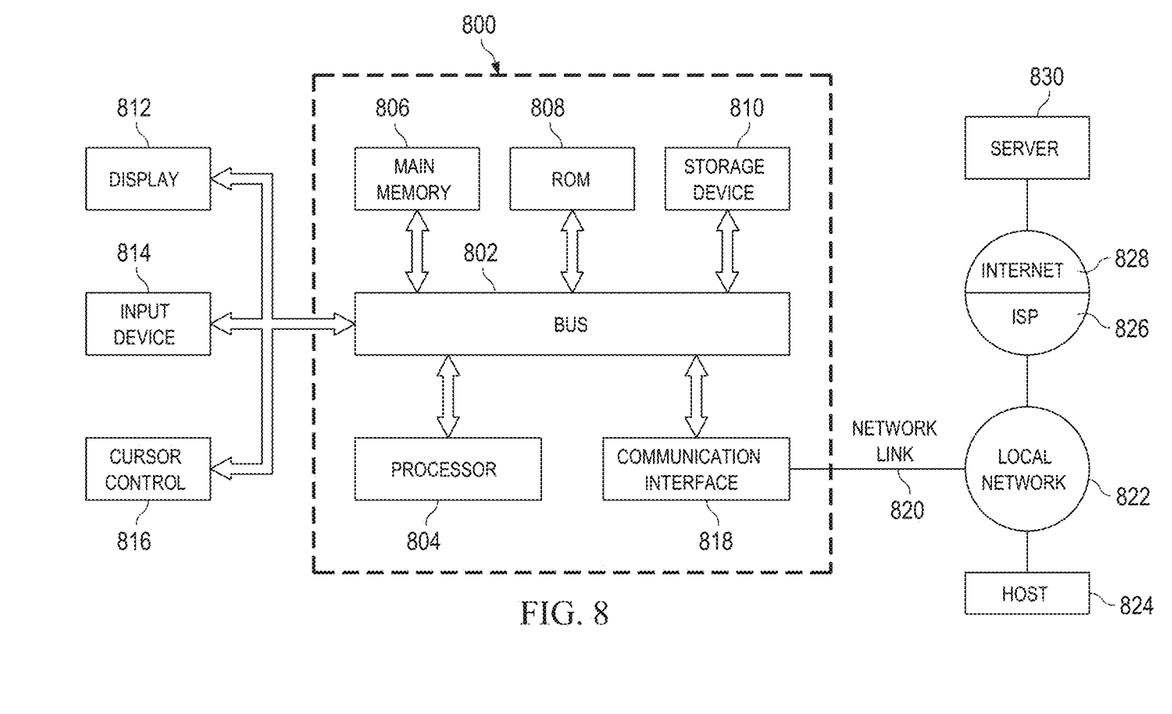
FIG. 8 is a block diagram illustrating an example computer system upon which the methods illustrated in FIG. 1 and FIG. 2, and the computer systems of the systems illustrated in FIG. 7 may be implemented.

For example, FIG. 8 is a block diagram that illustrates a computer system 800 upon which the techniques described above (see FIG. 1 and FIG. 2) and/or the visual content generation system 700 (see FIG. 7) may be implemented. The computer system 800 includes a bus 802 or other communication mechanism for communicating information, and a processor 804 coupled with the bus 802 for processing information. The processor 804 may be, for example, a general-purpose microprocessor.

The computer system 800 also includes a main memory 806, such as a random access memory (RAM) or other dynamic storage device, coupled to the bus 802 for storing information and instructions to be executed by the processor 804. The main memory 806 may also be used for storing temporary variables or other intermediate information during execution of instructions to be executed by the processor 804. Such instructions, when stored in non-transitory storage media accessible to the processor 804, render the computer system 800 into a special-purpose machine that is customized to perform the operations specified in the instructions.

The computer system 800 further includes a read only memory (ROM) 808 or other static storage device coupled to the bus 802 for storing static information and instructions for the processor 804. A storage device 810, such as a magnetic disk or optical disk, is provided and coupled to the bus 802 for storing information and instructions.

The computer system 800 may be coupled via the bus 802 to a display 812, such as a computer monitor, for displaying information to a computer user. An input device 814, including alphanumeric and other keys, is coupled to the bus 802 for communicating information and command selections to the processor 804. Another type of user input device is a cursor control 816, such as a mouse, a trackball, or cursor direction keys for communicating direction information and command selections to the processor 804 and for controlling cursor movement on the display 812. This input device typically has two degrees of freedom in two axes, a first axis (e.g., x) and a second axis (e.g., y), that allows the device to specify positions in a plane.

The computer system 800 may implement the techniques described herein using customized hard-wired logic, one or more ASICs or FPGAs, firmware and/or program logic which in combination with the computer system causes or programs the computer system 800 to be a special-purpose machine. According to one embodiment, the techniques herein are performed by the computer system 800 in response to the processor 804 executing one or more sequences of one or more instructions contained in the main memory 806. Such instructions may be read into the main memory 806 from another storage medium, such as the storage device 810. Execution of the sequences of instructions contained in the main memory 806 causes the processor 804 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may include non-volatile media and/or volatile media. Non-volatile media includes, for example, optical or magnetic disks, such as the storage device 810. Volatile media includes dynamic memory, such as the main memory 806. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that include the bus 802. Transmission media can also take the form of acoustic or light waves, such as those generated during radio-wave and infra-red data communications.

Various forms of media may be involved in carrying one or more sequences of one or more instructions to the processor 804 for execution. For example, the instructions may initially be carried on a magnetic disk or solid state drive of a remote computer. The remote computer can load the instructions into its dynamic memory and send the instructions over a network connection. A modem or network interface local to the computer system 800 can receive the data. The bus 802 carries the data to the main memory 806, from which the processor 804 retrieves and executes the instructions. The instructions received by the main memory 806 may optionally be stored on the storage device 810 either before or after execution by the processor 804.

The computer system 800 also includes a communication interface 818 coupled to the bus 802. The communication interface 818 provides a two-way data communication coupling to a network link 820 that is connected to a local network 822. For example, the communication interface 818 may be an integrated services digital network (ISDN) card, cable modem, satellite modem, or a modem to provide a data communication connection to a corresponding type of telephone line. Wireless links may also be implemented. In any such implementation, the communication interface 818 sends and receives electrical, electromagnetic, or optical signals that carry digital data streams representing various types of information.

The network link 820 typically provides data communication through one or more networks to other data devices. For example, the network link 820 may provide a connection through the local network 822 to a host computer 824 or to data equipment operated by an Internet Service Provider (ISP) 826. The ISP 826 in turn provides data communication services through the world wide packet data communication network now commonly referred to as the "Internet" 828. The local network 822 and Internet 828 both use electrical, electromagnetic, or optical signals that carry digital data streams. The signals through the various networks and the signals on the network link 820 and through the communication interface 818, which carry the digital data to and from the computer system 800, are example forms of transmission media.

The computer system 800 can send messages and receive data, including program code, through the network(s), the network link 820, and communication interface 818. In the Internet example, a server 830 might transmit a requested code for an application program through the Internet 828, ISP 826, local network 822, and communication interface 818. The received code may be executed by the processor 804 as it is received, and/or stored in the storage device 810, or other non-volatile storage for later execution.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. The code may also be carried by a transitory computer readable medium e.g., a transmission medium such as in the form of a signal transmitted over a network.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {C}, {A, B}, {A, C}, {B, C}, {A, B, C}. Thus, such conjunctive language is not generally intended to imply that certain embodiments require at least one of A, at least one of B and at least one of C each to be present.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Further embodiments can be envisioned to one of ordinary skill in the art after reading this disclosure. In other embodiments, combinations or sub-combinations of the above-disclosed invention can be advantageously made. The example arrangements of components are shown for purposes of illustration and it should be understood that combinations, additions, re-arrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method for digital processing, the method comprising:
   receiving a set of tristimulus values representing a first color in a color space;
   determining a first representation of a first spectral curve corresponding to the first color, wherein the first spectral curve is within a gamut of solid reflectances;
   determining a second representation of a second spectral curve corresponding to the first color, wherein the second spectral curve contains at least one reflectance wavelength outside the gamut of solid reflectances;
   selecting, based on a set of selection criteria, the first representation or the second representation as a selected spectral representation; and
   applying the selected spectral representation during digital processing.

2. The method of claim 1, wherein the digital processing includes rendering a scene.

3. The method of claim 1, wherein the digital processing includes compositing a scene.

4. The method of claim 1, wherein the selection criteria include the selected spectral representation increasing a brightness of at least one indicated color.

5. The method of claim 1, wherein the first representation comprises a first set of reflectance coefficients, and the second representation comprises a second set of reflectance coefficients and a first set of fluorescence coefficients.

6. The method of claim 5, wherein fluorescence coefficients in the first set of fluorescence coefficients are associated with an emission peak wavelength, concentration, and Stokes shift of a fluorescence model.

7. The method of claim 5, further comprising:
replacing the second set of reflectance coefficients and the first set of fluorescence coefficients with an adjacent set of reflectance coefficients and an adjacent set of fluorescent coefficients corresponding to a fourth color adjacent to a third color represented by the second representation.

8. The method of claim 5, wherein determining the first representation comprises reducing a distance between the first color and a second color associated with the first representation.

9. The method of claim 8, wherein the selection criteria include the distance being at or below a threshold value.

10. The method of claim 5, wherein the applying the selected spectral representation during digital processing includes:
determining a third color based on a sigmoid model that includes the second set of reflectance coefficients and the first set of fluorescent coefficients; and
using the third color during digital processing.

11. A computer system comprising one or more processors and a non-transitory storage medium storing instructions, which when executed by the one or more processors, cause the computer system to perform operations comprising:
receiving a set of tristimulus values representing a first color in a color space;
determining a first representation of a first spectral curve corresponding to the first color, wherein the first spectral curve is within a gamut of solid reflectances;
determining a second representation of a second spectral curve corresponding to the first color, wherein the second spectral curve contains at least one reflectance wavelength outside the gamut of solid reflectances;
selecting, based on a set of selection criteria, the first representation or the second representation as a selected spectral representation; and
applying the selected spectral representation during digital processing.

12. The computer system of claim 11, wherein the digital processing includes digital image processing.

13. The computer system of claim 11, wherein the first representation comprises a first set of reflectance coefficients, and the second representation comprises a second set of reflectance coefficients and a first set of fluorescence coefficients.

14. The computer system of claim 13, wherein fluorescence coefficients in the first set of fluorescence coefficients are associated with an emission peak wavelength, concentration, and Stokes shift of a fluorescence model.

15. The computer system of claim 13, wherein determining the first representation comprises reducing a distance between the first color and a second color associated with the first representation.

16. The computer system of claim 13, wherein the applying the selected spectral representation during digital processing includes:
determining a third color based on a sigmoid model that includes the second set of reflectance coefficients and the first set of fluorescent coefficients; and
using the third color during digital processing.

17. A non-transitory computer-readable storage medium storing instructions, which when executed by at least one processor of a computer system, causes the computer system to perform operations comprising:
receiving a set of tristimulus values representing a first color in a color space;
determining a first representation of a first spectral curve corresponding to the first color, wherein the first spectral curve is within a gamut of solid reflectances;
determining a second representation of a second spectral curve corresponding to the first color, wherein the second spectral curve contains at least one reflectance wavelength outside the gamut of solid reflectances;
selecting, based on a set of selection criteria, the first representation or the second representation as a selected spectral representation; and
applying the selected spectral representation during digital processing.

18. The non-transitory computer-readable storage medium of claim 17, wherein the selection criteria include the selected spectral representation increasing a brightness of at least one indicated color.

19. The non-transitory computer-readable storage medium of claim 17, wherein the first representation comprises a first set of reflectance coefficients, and the second representation comprises a second set of reflectance coefficients and a first set of fluorescence coefficients.

20. The non-transitory computer-readable storage medium of claim 19, wherein determining the first representation comprises reducing a distance between the first color and a second color associated with the first representation.

* * * * *